UNITED STATES PATENT OFFICE.

JOHN W. SCHLEICHER, OF ST. LOUIS, MISSOURI, AND ROBERT SCHLEICHER, OF LOUISVILLE, KENTUCKY, ASSIGNORS TO MENGEL BOX COMPANY, OF LOUISVILLE, KENTUCKY, A CORPORATION OF NEW JERSEY.

COMPOSITION GLUE.

1,162,712.     Specification of Letters Patent.     Patented Nov. 30, 1915.

No Drawing.     Application filed September 2, 1908. Serial No. 451,360.

*To all whom it may concern:*

Be it known that we, JOHN W. SCHLEICHER, a citizen of the United States, and resident of St. Louis, in the State of Missouri, and ROBERT SCHLEICHER, a citizen of the United States, and resident of Louisville, in the county of Jefferson and State of Kentucky, have invented certain new and useful Improvements in Composition Glue, of which the following is a specification.

Our present invention pertains to improvements in composition glue or cement, which is adapted more especially for use in connection with the manufacture of veneer boxes, crates and the like but is also applicable to other purposes.

The cement comprises water-glass, or silicate of soda, combined with chemically inert, friable material, such for instance as talc, pumice-stone or the like. The mineral ingredient or ingredients are ground as fine as or finer than flour and mixed with the water-glass until the composition has the consistency of relatively thick syrup or molasses. The quantity of earthy material to be added depends upon the consistency of the water-glass, and the consistency of the final product should be such as to prevent the cement from running through cracks, splits, checks or the like in the wood to which it is applied.

In use, for the manufacture of veneer lumber, it has been found that a mixture composed of one pound of talc to sixteen pounds of silicate of soda produces a very efficient composition. The silicate of soda entering into the foregoing mixture before the addition of talc read $3\frac{2}{3}$ degrees Baumé, while the mixture read $3\frac{4}{5}$ degrees Baumé; the temperature at both readings being 67° F.

While the foregoing has been found highly efficient in practice, it will be understood that the proportions will vary more or less according to the texture of the material upon which it is to be used. Thus, for instance, an open-grain wood takes or requires more talc than a close-grain piece.

In practice it has been found that the material dries rapidly and is quite stable. While it is impossible to state absolutely why the cement is stable in use, it is probably due to the fact that the mineral substance acts as a lute and prevents the entrance of moisture, air or water directly to the joint between the parts which are secured together by the cement.

The quick-drying property of the substance, the ease with which it may be applied, together with its stability, render the cement highly desirable and efficient. It has been found especially serviceable in the manufacture of compound lumber.

The cement has the further characteristic that it may be disassociated by water, thereby permitting a box or the like to be disassembled should it become desirable for any reason so to do. Again, the cement permits of the lumber being cut by ordinary tools and, furthermore, the cement does not have to be heated, the mixture being of a uniform consistency.

Having thus described our invention, what we claim is:

1. As a new article of manufacture, a cement composed of water-glass, combined with finely-divided earthy material, chemically inert so far as the water-glass is concerned, said cement being characterized by the fact that it may be disassociated or broken up by water.

2. As a new article of manufacture, a cement composed of water-glass and finely-ground talc, said cement being characterized by its substantially constant fluid consistency when cold, and likewise being capable of disassociation by water.

3. As a new article of manufacture, a liquid glue or cement, composed of water-glass combined with a finely-powdered, insoluble material chemically inert so far as water-glass is concerned, said cement being liquid in its character and available for use in either a cold or a hot condition.

In testimony whereof, we have signed our names to this specification in the presence of two subscribing witnesses.

JOHN W. SCHLEICHER.
ROBERT SCHLEICHER.

Witnesses to the signature of John W. Schleicher:
A. J. McGOARTY,
LOUISE R. WICH.

Witnesses to the signature of Robert Schleicher:
H. P. ROBERTS,
FRANK VAN BORRIES, Jr.

Copies of this patent may be obtained for five cents each, by addressing the "Commissioner of Patents, Washington, D. C."